United States Patent
Chiang

(10) Patent No.: US 7,464,088 B1
(45) Date of Patent: Dec. 9, 2008

(54) ARCHITECTURE FOR EFFICIENT PATTERN MATCH OPERATIONS

(75) Inventor: David Chiang, Saratoga, CA (US)

(73) Assignee: Sage-N Research, Inc., San Jose, CA (US)

( * ) Notice: Subject to any disclaimer, the term of this patent is extended or adjusted under 35 U.S.C. 154(b) by 533 days.

(21) Appl. No.: 10/846,174

(22) Filed: May 13, 2004

Related U.S. Application Data

(60) Provisional application No. 60/501,586, filed on Sep. 8, 2003.

(51) Int. Cl.
*G06F 7/00* (2006.01)
*G06F 12/00* (2006.01)

(52) U.S. Cl. ............................... 707/6; 707/3; 711/108

(58) Field of Classification Search .................. 707/1–3, 707/6; 711/108; 365/49
See application file for complete search history.

(56) References Cited

U.S. PATENT DOCUMENTS

| | | | | |
|---|---|---|---|---|
| 5,499,191 A | * | 3/1996 | Young | 716/17 |
| 5,884,303 A | * | 3/1999 | Brown | 707/3 |
| 6,018,739 A | * | 1/2000 | McCoy et al. | 707/102 |
| 2002/0091690 A1 | * | 7/2002 | Bailey et al. | 707/6 |
| 2004/0073550 A1 | * | 4/2004 | Meirovitz et al. | 707/6 |

OTHER PUBLICATIONS

Babb, E. Implementing a Relational Database by Means of Specialized Hardware. ACM Transactions on Database Systems, vol. 4, No. 1, Mar. 1979, pp. 1-29.*

Freeman, Harvey A. A Microprocessor-Based Design of the Data Base Computer. 1979 IEEE, pp. 179-182.*

* cited by examiner

*Primary Examiner*—John Cottingham
*Assistant Examiner*—Robert Timblin
(74) *Attorney, Agent, or Firm*—Bever, Hoffman & Harms, LLP; Jeanette S. Harms

(57) ABSTRACT

A system architecture optimized for pattern match applications is provided. This system architecture includes a host computer and a pattern match accelerator (PMA), which in turn includes one or more pattern match units (PMUs) and PMU control logic. The PMU control logic can divide a database, transmitted by the host computer, such that each of the PMUs receives a database portion. Each PMU includes a main memory for storing the database portion and a programmable logic device (PLD). The PLD can perform a search and score operation on its database portion. Advantageously, the PLD can be configured to generate an index of the database portion, and then configured to perform the search and score operation using that index. The PMU control logic can assemble the results of the pattern match application from each of the PMUs.

13 Claims, 12 Drawing Sheets

| Parameter | Max | Min | # Bits | SwissProt Database |
|---|---|---|---|---|
| Database Entry # | 16M-1 | 0 | 24 | 131,945 |
| Entry Annotation ChkSum | 255 | 0 | 8 | N/A |
| Length of Database Entry | 16K-1 | 1 | 14 | ~8000 |
| Sequence Amino Acid Offset (to identify sub-sequence) | 16K-1 | 0 | 14 | N/A |
| Length Of Sub-sequence | 127 (in amino acids) | 4 | 8 | <100 |
| Index (mass in 1 Dalton resolution) | 32K-1 (in Daltons) | 1 | 16 | <32K-1 |
| Physical Address (64M x 64 bits main memory) | $2^{26}-1$ | 0 | 26 | N/A |
| AA Identifier (ASCII letter) | 5Ah ("Z" in ASCII) | 41h ("A" in ASCII) | 8 | N/A |

Figure 11

ARCHITECTURE FOR EFFICIENT PATTERN MATCH OPERATIONS

RELATED APPLICATIONS

This application claims priority of U.S. Provisional Patent Application 60/501,586, entitled "Architecture For Efficient Pattern Match Operations" filed Sep. 8, 2003.

BACKGROUND OF THE INVENTION

1. Field of the Invention

The present invention relates to pattern match and, in particular, to architecture that provides efficient pattern match operations.

2. Description of the Related Art

Pattern match applications are becoming increasingly important in life science, Internet commerce, and other fields. In general, a pattern match application includes four steps. In a first step, the database can be prepared. This step can further include creating secondary files (e.g. index files), where needed, and updating the database as needed. In a second step, a search can be performed that compares candidates within the database with an input query pattern. Typically, the pattern match application specifies one or more minimal requirements for matching. In a third step, each candidate is scored. Finally, in a fourth step, the most relevant matches can be output.

One familiar example of pattern match is an Internet search engine that finds web pages matching the input query words, wherein the resulting database consists of all stored web URLs. Key words may be used as indices within index tables to quickly find a number of web URLs that contain the word. In this case, the pattern to be matched is a one-dimensional search consisting of a series of letters forming words and phrases. The pattern match operation consists of a "search" part followed by a "score" part. The match candidates may consist of all URLs containing at least one word in the input query, for example. Note that the vast majority of URLs that don't contain any query words are not scored. Each candidate is then scored according to a formula that may involve the number of input query words within the URL, how many other URLs reference the given candidate, and so on. These scored web pages, stored in an output file, can be displayed to the user in decreasing final score.

Pattern match is also used extensively in the life sciences. For example, within the field of genomics, the popular program BLAST from the National Center for Biotechnology Institute (NCBI) accepts a DNA or protein sequence represented by a string of characters, wherein each string of characters represent a nucleotide or amino acid. For each query, the BLAST program will output a set of the most closely matched sequences from the database based on a user-specified scoring criterion. Drug discovery researchers use BLAST to derive a hypothesis of the function of an unknown protein or DNA sequence by comparing it to a database of known protein and genome entries.

Pattern match can also be used in the field of proteomics for protein identification using mass spectrometry. For example, programs such as SEQUEST from the University of Washington, X!TANDEM from the Manitoba Proteomics Centre, and OMSSA from NCBI identify an unknown protein by matching its measured mass spectrum against theoretical mass spectra from a protein database. Specifically, the proteins in the resulting database that provide the highest scoring matches with the query are the most likely candidates for the unidentified chemical.

Note that while one-dimensional pattern match is appropriate for some applications, multi-dimensional pattern match may be desirable for other applications. For example, protein structure prediction using Support Vector Machines and other machine learning methods involves matching the input protein sequence to sets of categorized protein classes in multi-dimensional vector space. Two-dimension image analysis is used to match and align 2-D GEL images involving thousands or more patterns. Phylogenic studies require matching the genomes from different species to determine their evolutionary chronology. These analyses involve significant computation that matches complex patterns. This type of pattern match can benefit from massively parallel integer (or simple floating point) operations of relatively large databases.

In contrast to calculation-based applications that emphasize high-precision floating-point performance, current pattern match applications require massively parallel variable-length integer operations on large databases. Unfortunately, standard computers are not well suited to pattern match because of their rigid (usually 32-bit or 64-bit) arithmetic logic units (ALU), the relatively small number of such ALUs per processor, limited memory address space (only 4 gigabytes in popular 32-bit processors like the Intel Pentium 4), and bus-limited memory bandwidth between the processor and the main memory.

Additionally, on-chip resources used in standard computers, such as floating point units and cache memory, occupy significant chip space and increase static power dissipation, but are used rarely during run-time of the pattern match application. For example, for the bulk of the pattern match application run-time, where more than 95% is spent in the "search and score" functions, these on-chip resources do not add value and, in fact, may adversely affect the running of a pattern match application. For example, the 32-bit address space of a Pentium 4 PC limits the main memory to 4 gigabytes, which requires larger databases (e.g. the databases typically found in pattern match applications) to be partitioned and processed in pieces, thereby increasing runtime as well as the complexity of the pattern match software.

Sequential Searching Using a Standard Computer

FIG. 1 illustrates a simplified pattern match method 100 including a sequential search. In step 101, a database can be prepared. Note that in typical embodiments, step 101 can be performed separately from the pattern match application, and is merely shown in method 100 for completeness. In a sequential search, database preparation may be as simple as assembling the correct file with the correct file name. In one embodiment, the database may also be reorganized to strip out any annotation and other header information from the database core and replace that information with a small numerical value. This reorganization can reduce the file size of the database during the search, thereby streamlining the sequential comparisons. Further variations can include allowing multiple databases to be accessed, or restricting the analysis to specific sections of the database, e.g. accessing only the human entries in a protein database rather than across all species.

When a pattern match application is run on a query, the query is first pre-processed in step 102 to check for errors/missing information, make format adjustments, or eliminate noise. In one embodiment, the query may also be modified to specific data representations that improve pattern match, e.g. building a table of all occurrences of 3-letter instances to search for and their location in the query. Note that in some embodiments, multiple queries can be simultaneously used.

For example, the OMSSA protein identification program can store several hundred queries before the database is searched. In this manner, as each database entry is analyzed, there are more chances for this entry to be a candidate match for one of the stored queries.

After the query (or queries) is pre-processed, the database can be searched sequentially. In general, a sequential search means that all the entries in the database are analyzed one at a time against the query, e.g. from the first entry to the last. To begin this search, step 103 can determine whether another database entry is present. If so, then the database entry can be compared to the query in step 104.

In one embodiment of step 105, each entry in the database (also called a candidate herein) can be pattern-matched with the query on a "rough scale" to find a hit. For example in the case of BLAST protein searches, each protein database entry could be checked for the existence of a 3-letter combination determined from the query pre-processing (step 102).

If the candidate meets the predefined criterion, e.g. using the rough scale, then step 106 can calculate the score and the results. In one embodiment, only scores that surpass a threshold are stored for post-processing. Note that steps 104-106, which comprise the "search and score" operation of the pattern match application, take up the majority of the run-time.

If the candidate does not meet the criterion in step 105, then that database entry is discarded. After either or steps 105 or 106, process 100 returns to step 103 to determine whether another database entry is present. After all database entries have been evaluated, as determined by step 103, the set of stored matches and their scores can be post-processed. This post-processing can include picking out the highest scoring ones, determining overall statistics, incorporating annotations where appropriate, and/or reformatting the match list for user readability.

Sequential searching using a standard computer has the following benefits. First, sequential searching allows substantially any conceivable criterion and/or pattern scoring method to be implemented. Second, a standard computer is well suited to the pre-processing and post-processing of the pattern match application. For example, the query can be filtered in step 102 to eliminate input noise and extraneous information. These functions often require processing of user options and format changes that can be easily performed by a standard computer. Similarly, post-processing of the sorted pattern match outputs in step 107 may involve extensive statistical processing and output formatting that can be easily performed by a standard computer.

Unfortunately, sequential searching using a standard computer also has the following disadvantages. First, searching every database entry results in algorithmic inefficiency. Specifically, the search time grows proportionately with the database size. Because the size is growing exponentially for many important life science databases, the search time quickly becomes impractical.

Second, the run-time of the standard computer is limited by processor bus bandwidth, not memory bandwidth. As noted above, most of the system time is spent in the search-and-score loop involving simple integer operations, which should theoretically be limited only by the memory bandwidth. However, in most cases, the processor bus is the limiting factor because it is shared by many processor peripherals.

Third, a processor of a standard computer can handle only one comparison in a serial manner, which limits the overall throughput of the pattern match application.

Fourth, the memory space limitation (32-bits, or 4 gigabytes for modern PCs) is too small for many DNA and protein databases. For example, the human genome alone contains 3.2 billion base pairs, or about 800 megabytes using 2 bits per base pair. Therefore, databases of multiple species can exceed the 4 gigabytes limit of a standard computer. To provide additional storage, disk access can be used, thereby compensating for this inadequate memory space. However, accessing a disk is highly inefficient and therefore can considerably slow the throughput.

Index Searching Using a Standard Computer

FIG. 2 illustrates a simplified pattern match method 200 including an indexed search. Compared to serial searching, an indexed search allows a faster run-time by looking only at entries with potential to be a candidate, at the expense of additional complexity during the database preparation step. Specifically, in step 201, a database can be prepared and an index table can be generated from that database.

Generating the index table typically includes creating a list of indices, wherein each index has an associated list of all database instances associated with that index. For example, for an index search with BLAST, the protein sequence database may be used to generate an index table, indexed by 3-letter keys, whose list contains all the instances of that 3-letter key within the database (e.g. in the form of database entry and beginning position).

The query can be pre-processed in step 202 to check for errors/missing information, make format adjustments, or eliminate noise (see also, step 102 of FIG. 1). After the query is pre-processed, the database can be searched by index. Specifically, step 203 can determine whether an index corresponding to the query is present.

For example, if the first 3 letters of the query are "DEF", instead of looking for the instance of "DEF" in the first database entry, then the second, and so on (as would be performed for a sequential search), the pattern match application will read in the index file that lists all instances of "DEF" throughout the database. If an index corresponding to the query is present, then step 204 can determine whether a database entry in that index is present. If a database entry is present, then that database entry can be compared to the query in step 205.

If the candidate meets the predefined criterion, as determined by step 206, then step 207 can calculate the score and the results. If the candidate does not meet the criterion in step 206, then that database entry is discarded. After either or steps 206 or 207, process 200 returns to step 204 to determine whether another database entry is present. After all database entries in an index have been evaluated, as determined by step 204, process 200 returns to step 203 to determine whether another index associated with the query is present. Thus, for example, if the $4^{th}$ letter in the query is "G", then the pattern match application can read in the list associated with "EFG" for all of its instances. This process is repeated for all the 3-letter combinations until the last one is encountered at the end of the query sequence. Finally, after all indexes corresponding to the query have been evaluated, as determined by step 203, the set of stored matches and their scores can be post-processed in step 208.

The "search and score" operation for index searching is typically faster than sequential searching because fewer database entries are compared to the query (note that the actual scoring time would be the same). However, in practice, index searching is typically not used within the life sciences because of the following disadvantages.

First, the search criteria change too frequently, thereby requiring frequent re-indexing operations. Specifically, every time the search criterion changes, it is necessary to re-run the indexing program. For example, if the search criterion for BLAST looks for 4-letter combinations rather than 3-letter ones, the entire index table must be re-generated. For large databases, the indexing time can take many hours, which results in reduced overall throughput.

Second, the index table generation takes too long for users. Standard computers are slow at generating files that exceed several gigabytes for at least two reasons: limited address space and inefficiency in sorting large files. Large index tables on large databases can easily exceed the main memory limit of PCs, thereby causing the computer to operate on small chunks memory, e.g. 256 megabytes of memory, at a time. As mentioned previously, this can result in excessive disk swapping. Additionally, the sorting operation required within index table generation is a known, time-consuming software problem on large databases, especially if the each sorting block must be within the limited main memory space.

Third, the index table is too large, thereby requiring frequent disk access that reduces run-time improvements. Specifically, the index table is typically an "inverted file", wherein the entries are listed using the attribute as the key. In practical terms, this means that the index table can be from 3 to greater than 10 times larger than the database.

Thus, running pattern-matching applications on standard computers, whether using sequential searching or index searching, have significant disadvantages.

PC Clusters

To increase throughput using standard computer architecture, clusters of networked PCs can be used. A PC cluster includes a master "node" that controls the overall data flow with the other slave nodes doing the distributed computation. Typically, a large database is partitioned evenly across all the nodes. The same "search and score" application can be run on all the nodes, with the collective results reported back to the master node for consolidation.

While the PC cluster increases the throughput compared to single computers, a PC cluster also has disadvantages. For example, a PC cluster has the same silicon inefficiency as a single computer. Specifically, the overall memory architecture is also distributed locally among the nodes rather than shared among the nodes. This distribution makes for inefficiency where common data must be replicated in the distributed memory blocks.

Moreover, a PC cluster still has a limit as to how many processors may be used due to space and power dissipation. Specifically, a processor (e.g. a processor drawing on the order of 65 watts) and associated disk drives can generate considerable heat. Thus, the heat generated by a PC cluster, if not dissipated, can significantly increase internal operating temperatures to the point where system performance is compromised (i.e. a reduction of system reliability). Therefore, the use of PC clusters must include providing considerable power to sufficiently cool the system. Additionally, the use of PC cluster further includes increased maintenance time to service defective processors due to heat-induced failures. For example, the time involved in loading maintenance software on each of a 100-processor PC cluster may be close to 100 times that of a single PC.

Reconfigurable Computers

Reconfigurable computers are special purpose data processing systems for accelerating algorithms in compute-intensive problems using a massively parallel approach. Reconfigurable computers, typically built using large FPGAs, offer very high computing resources with a high-degree of interconnectivity and relatively small main memories.

For example, FIG. 3A illustrates a commercially available reconfigurable computing platform 300 (the "BenERA" platform with up to four DIME-II modules, all available from Nallatech in Glasgow, Scotland), with a maximum of 80 million system gates (using eight XC2V10000 Xilinx FPGAs, each with 10 million system gates) in the system core. Platform 300 provides high-speed 64-bit busses between each DIME-II module (e.g. a "BenBLUE-II" module 301, as illustrated in greater detail in FIG. 3B, each containing up to two XC2V10000 FPGAs). Notably, platform 300 provides only 32 megabytes of memory for system use.

Reconfigurable computers have been popular for specialized digital signal processing applications that require extensive computation on a relatively small memory space, such as performing 1024-point Fast Fourier Transform or image compression using a discrete cosine transform in target applications such as cellular base stations, radar, or medical imaging. Unfortunately, reconfigurable computers, particularly due to the high logic-to-memory resources and the scarcity of main memory, are not directly suited for pattern match applications. Specifically, as noted above, pattern match applications have small computation requirements (in the sense of small integer or fixed point arithmetic) and a limited need for interconnectivity, but are very memory-intensive.

Bioinformatics Accelerators

FIG. 4 illustrates a simplified bioinformatics accelerator architecture 400 including a host computer 401 and an accelerator 402. In a typical embodiment, accelerator 402 can include a logic block 403 (either fixed or reconfigurable) and a scratch memory. FIG. 5 illustrates the basic functions performed by host computer 401 and accelerator 402.

Bioinformatics accelerator 400 uses an approach similar to that discussed in reference to "Sequential Searching Using Standard Computer", wherein each database entry is individually compared. However, to achieve run time improvement through parallelism, multiple (e.g. 100 or more) queries are batched together and downloaded from host computer 401 to scratch memory 404 (step 501). After a predetermined number of queries are stored in scratch memory 404, the database entries (stored on host computer 401) are sent (step 502) to logic block 403 one-by-one for comparison to all of the stored queries in parallel (e.g. comparing 1 entry versus N queries) (step 504).

When a matching entry is found by any of the parallel comparison circuits, logic block 403 can generate a score (step 504). That score can be reported back to host computer 401 (step 505) as well as stored in scratch memory 404 (step 506). After the entire database is streamed through accelerator 402, host computer 401 can provide another batch of queries. When all processing is complete, host computer 401 can provide any post-process function as well as output the results (step 503).

Using a batch approach to queries can be significantly faster than sequential searching. However, the bioinformatics accelerator has the following disadvantages. First, the response time for each query is slow. Specifically, architecture 400 cannot provide fast single-query response times, such as the case where real-time pattern match is needed. For example, it is desirable for a pattern match application to be run in conjunction with a protein or genomic sequencing system, so that each individual output can be analyzed as it becomes available. The batch analysis approach of the bioinformatics accelerator cannot provide an analysis of individual outputs.

Second, the bus bandwidth of architecture 400 limits overall performance. Specifically, the minimum time to complete a query search is determined by the time it takes host computer 401 to read out and send the entire database to accelerator 402, plus the time accelerator 402 requires to compare and score. Thus, this minimum time can be limited by the bus bandwidth of architecture 400.

Third, architecture 400 is incompatible with index search algorithms that can be employed in software-only solutions. As noted previously, the speed benefit from index searching comes from getting more information with each memory access, at the expense of accessing a much larger file (i.e. the index table, which is typically 3 to 10 or greater times the database for many common search conditions). For standard computers, the larger file sizes do not add memory access time significantly. However, for bioinformatics accelerators that stream the database through the accelerator, larger file sizes cause longer runtime. Therefore, bioinformatics accelerators are typically not used for index searching, thereby limiting their use to cases where required re-indexing is impractical or when specifically requested by a user.

Therefore, a need arises for a data processing architecture optimized for pattern match applications, especially those currently found in life science, Internet commerce, and other fields. This data processing architecture would have the following attributes: high-throughput, silicon efficiency, low power dissipation, smaller space, high reliability, optimized memory bandwidth, and a scalable architecture.

SUMMARY OF THE INVENTION

With databases growing exponentially and increasing demand for faster throughput, pattern match applications continue to drive a large segment of the high-performance computing market. In accordance with one aspect of the invention, a system architecture can be optimized for pattern match applications, especially those currently found in life science, Internet commerce, and other fields.

In accordance with one aspect of the invention, a system architecture for pattern match applications is provided. This system can include a host computer and a pattern match accelerator. The host computer can be used for transmitting a database and a query of the database. The pattern match accelerator can receive the database and the query, perform search and score operations for a pattern match application on the database using the query, and provide results of the pattern match application to the host computer. The host computer can outputs those results and provide post-processing of the results before outputting, as needed.

To provide the search and score function, the pattern match accelerator can include one or more pattern match units and pattern match unit (PMU) logic. The PMU control logic, which interfaces between the host computer and the pattern match units, can divide the received database such that each of a plurality of pattern match units receives a database portion. After the search and score operation is complete, the PMU control logic can assemble the results of the pattern match application from each of the pattern match units. In one embodiment, assembling the results can include filtering the results and/or ranking the results.

Each pattern match unit can include a main memory and a programmable logic device. The main memory can store a portion of the database. The programmable logic device can perform the search and score operation on that portion of the database using the query sent by the host computer. In other words, each pattern match unit can act as an accelerator using its own database portion. In this manner, a pattern match application is effectively divided into the same application running independently on multiple pattern match units. Therefore, pattern match applications can be advantageously scaled to extremely large database sizes without the need for costly high-speed interconnection networks between subsystems, as required by reconfigurable computers.

Moreover, because the database is stored in the main memories within the pattern match units, i.e. not within the host computer, the pattern match accelerator experiences no processor bus bandwidth limitation during search and score operations. Therefore, the pattern match accelerator architecture described herein also has significant speed advantages over a bioinformatics accelerator. Note that in one embodiment, the host computer can function as a virtual pattern match unit if the database exceeds a predetermined size. This use of a virtual pattern unit can minimize performance degradation when the database size increases beyond the combined memory limit of the pattern match units.

The programmable logic device can advantageously provide dual-use of silicon resources to facilitate search and score operations. For example, the programmable logic device can be configured at a first point in time to generate an index of the database, which can then be stored in the main memory. At a second point in time, the programmable logic device can be configured to perform the search and score operation using the index. This dual-use of silicon resources results in high silicon efficiency.

Note that this indexing can be performed rapidly because the database is effectively indexed in parallel and independently within each pattern match unit. Further, this indexing can be performed with hardware (i.e. all of the programmable logic resources), which is inherently faster than using software (although software can also be used with the programmable logic device). Yet further, the data bandwidth of this indexing is not limited by any factors other than the main memory.

In one embodiment, the main memory can be mapped such that a database portion starts from one end of the main memory whereas the index starts from another other end of the main memory. This memory mapping can optimally use the memory because the ratio of index table to the database varies depending on the index operation. Additionally, this memory mapping allows new database entries and new index entries derived from those new database entries to be added incrementally (i.e. with a re-sorting of the index table).

In another embodiment, the main memory can include a first memory for storing an unsorted index table and a second memory for storing a sorted index table. This split-memory pattern match unit can facilitate fast indexing. In yet another embodiment, each database entry in the main memory can include an entry number and a checksum to cross-correlate the results in the host computer. Including the entry number and the checksum can advantageously eliminate errors in case the database, in either the host computer or the pattern match accelerator, becomes corrupted.

BRIEF DESCRIPTION OF THE FIGURES

FIG. 11 shows the definition of the parameters used in the memory map of FIG. 10.

Note that elements/components/steps having identical reference numerals have the same functions.

DETAILED DESCRIPTION OF THE FIGURES

Figure 1:
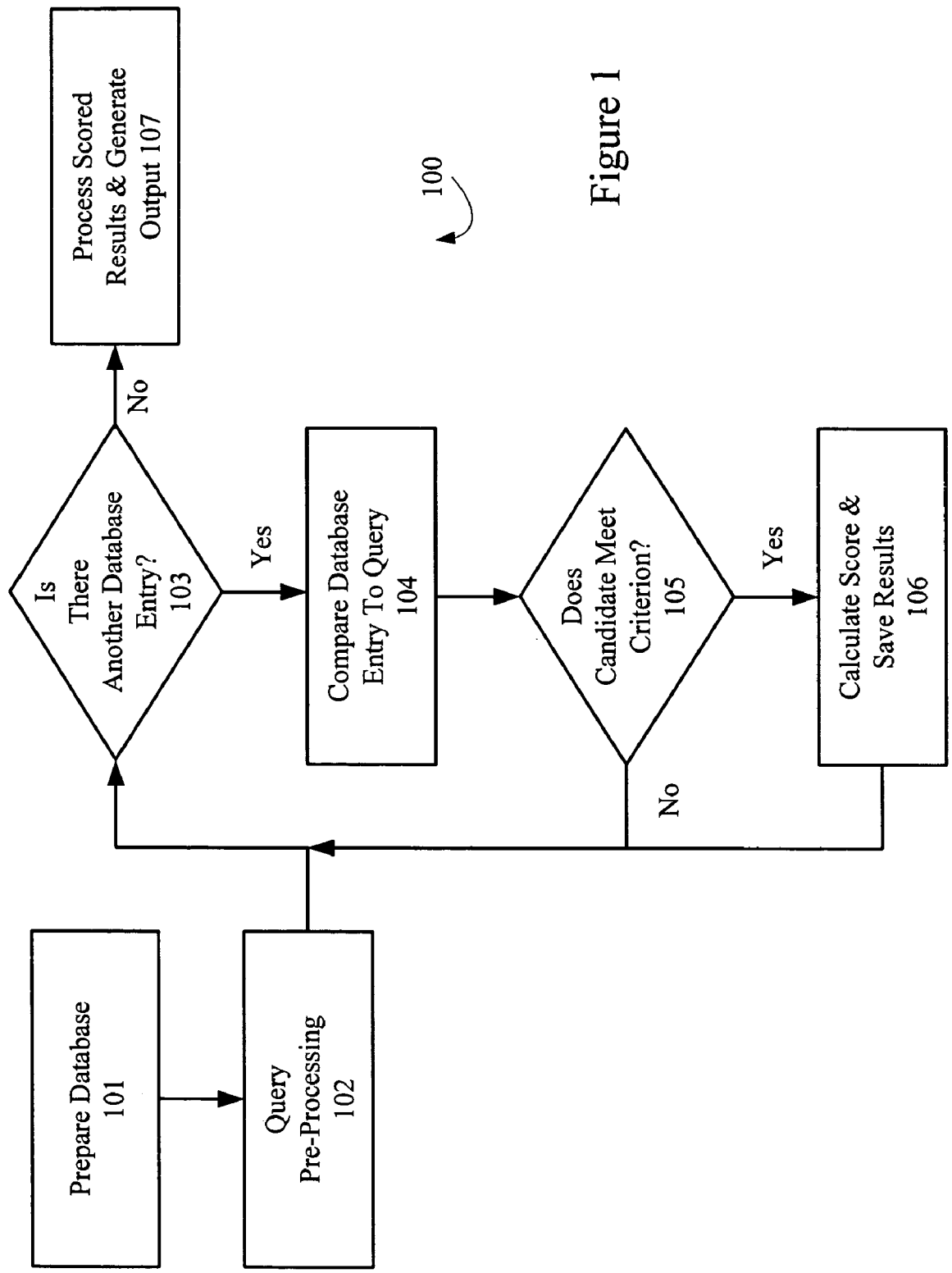
FIG. 1 illustrates a simplified pattern match method including a sequential search.
Figure 2:
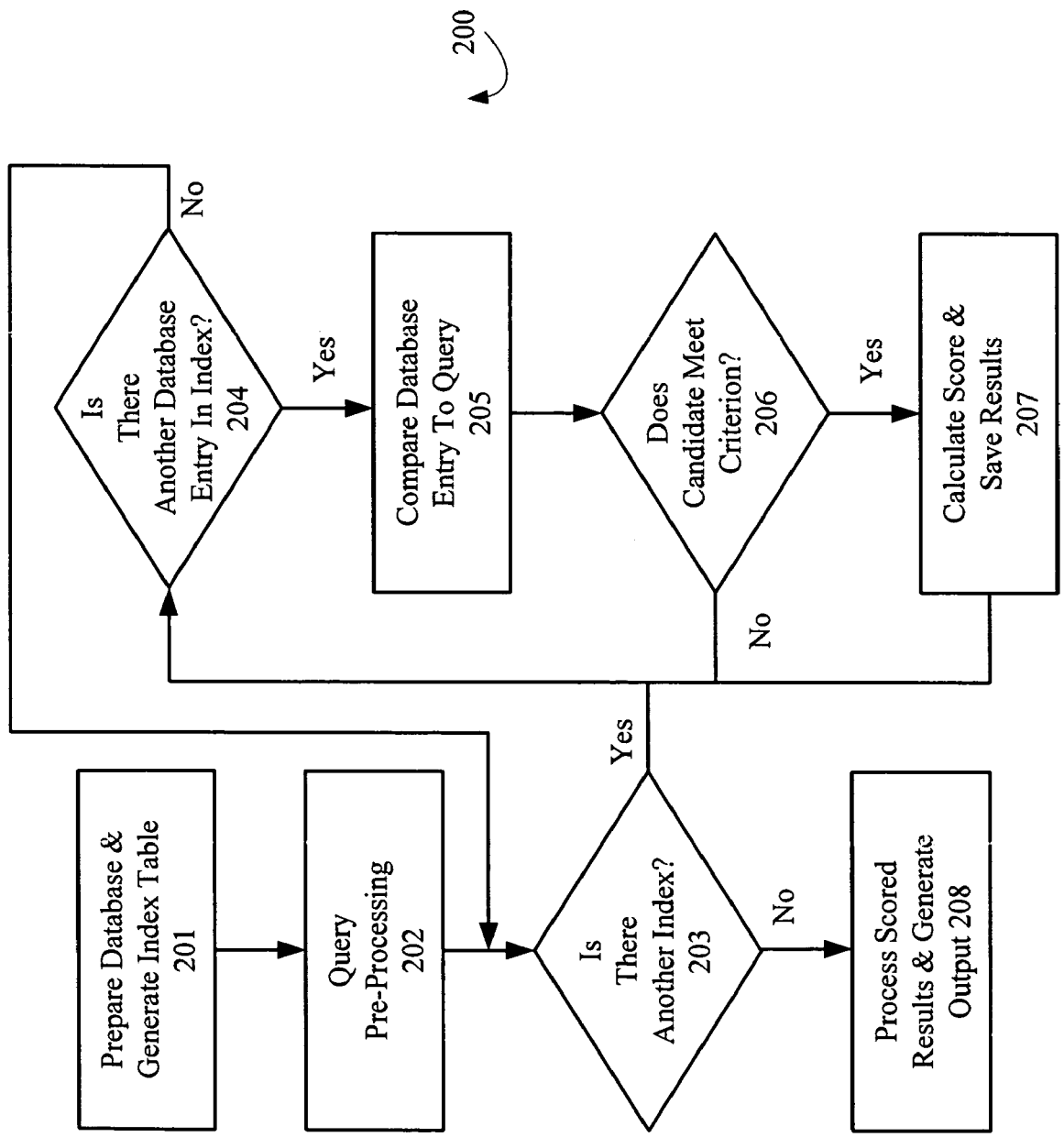
FIG. 2 illustrates a simplified pattern match method including an indexed search.
Figure 3A:
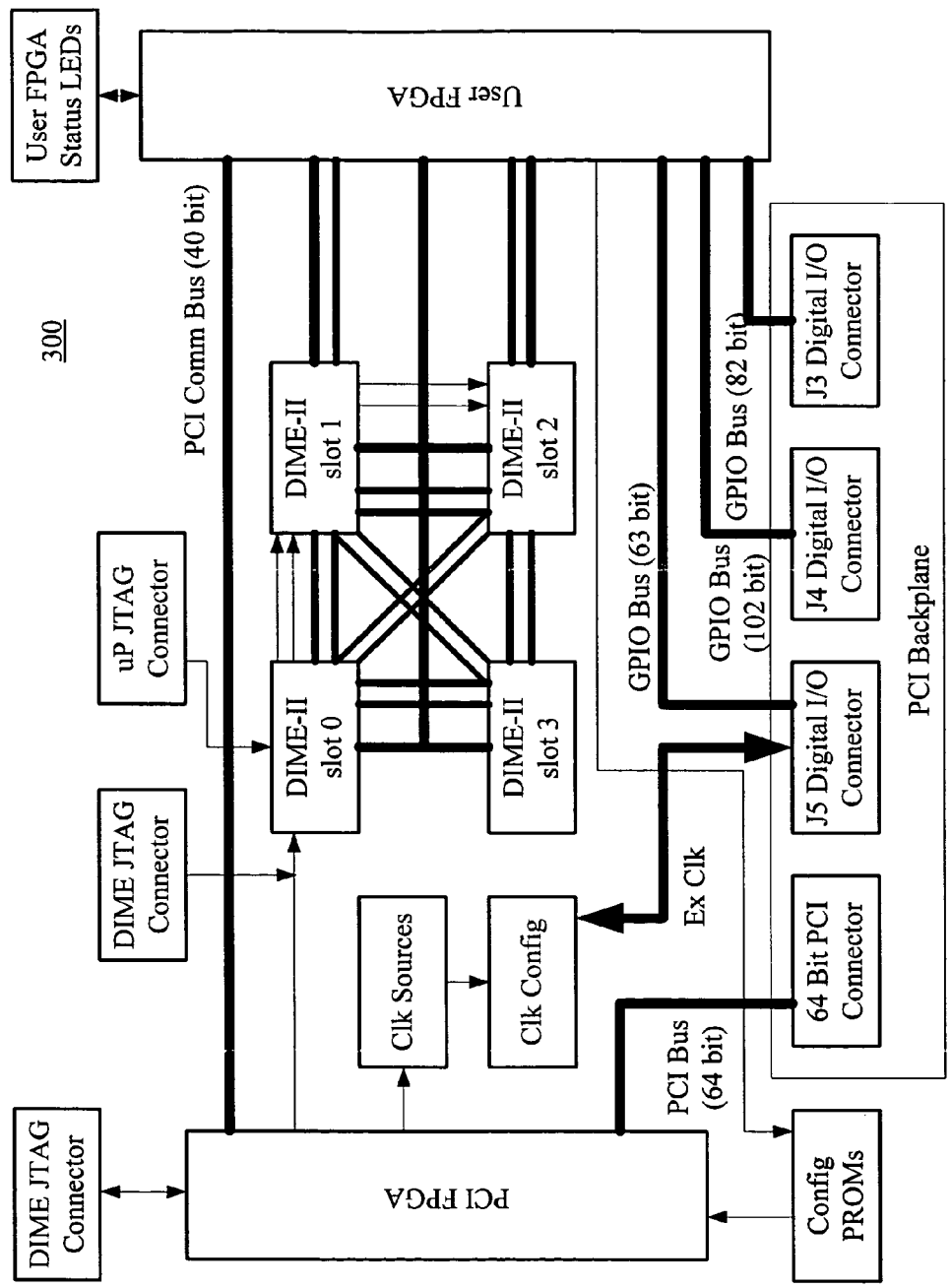
FIG. 3A illustrates an exemplary reconfigurable computer built using large FPGAs.
Figure 3B:
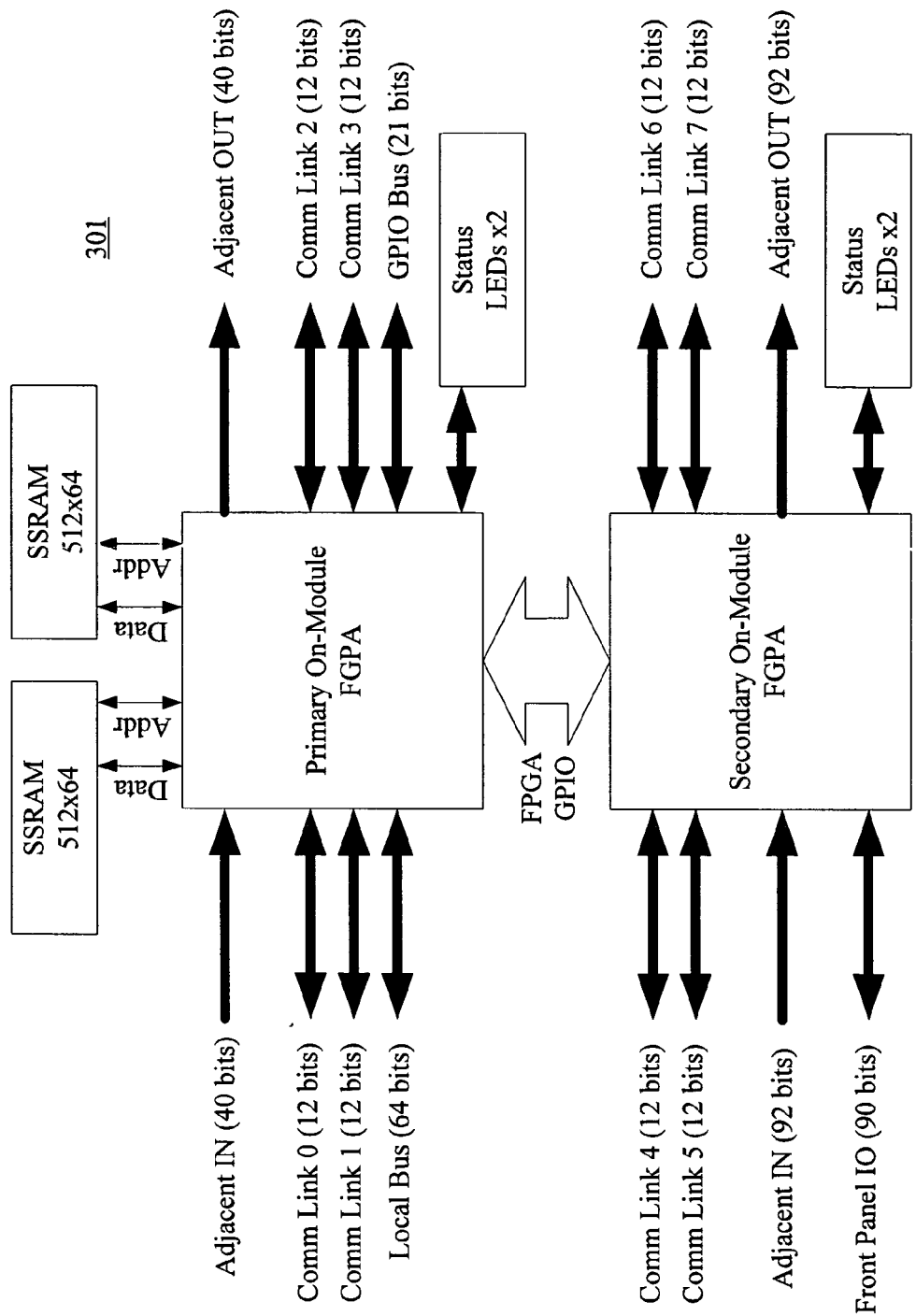
FIG. 3B illustrates an exemplary logic module of the reconfigurable computer of FIG. 3A.
Figure 4:
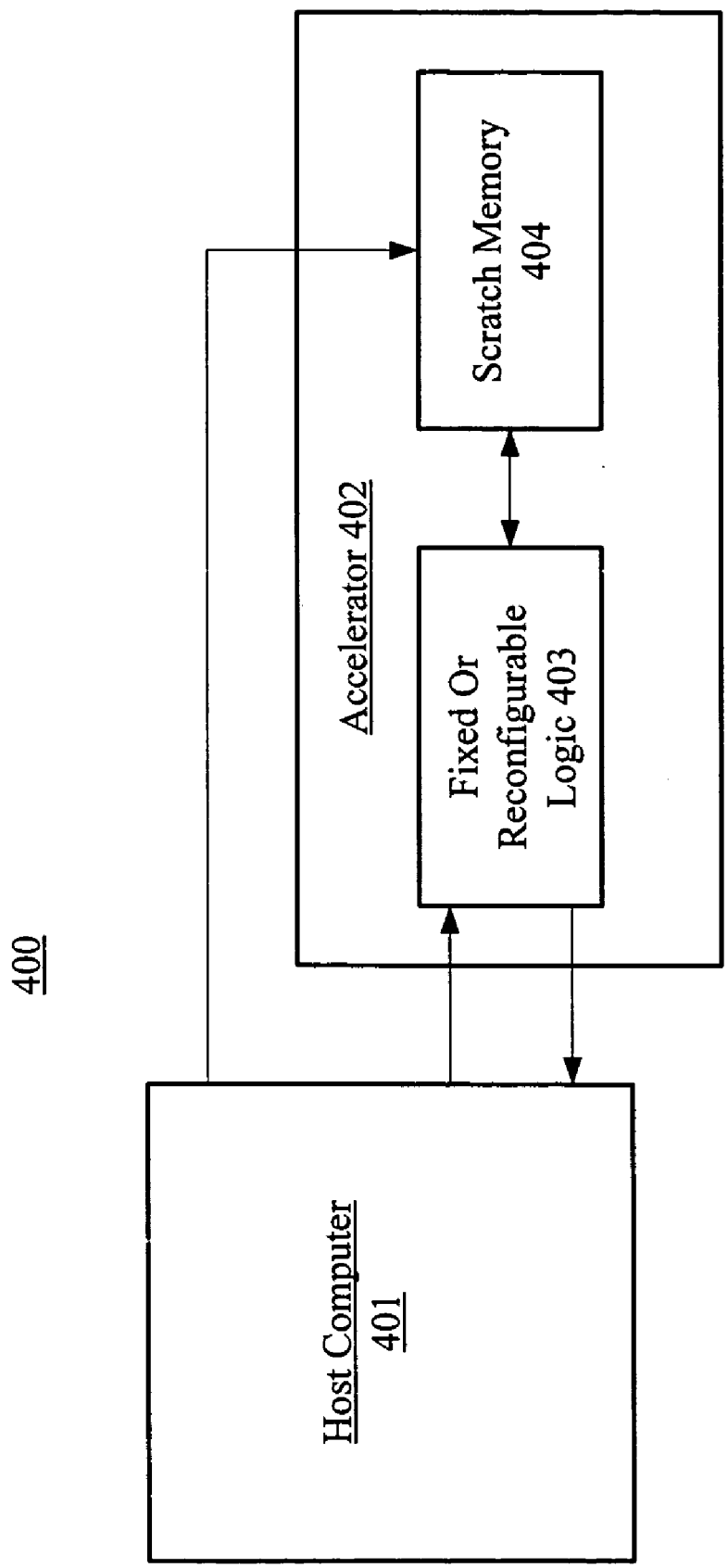
FIG. 4 illustrates a simplified bioinformatics accelerator architecture including a host computer and an accelerator.
Figure 5:
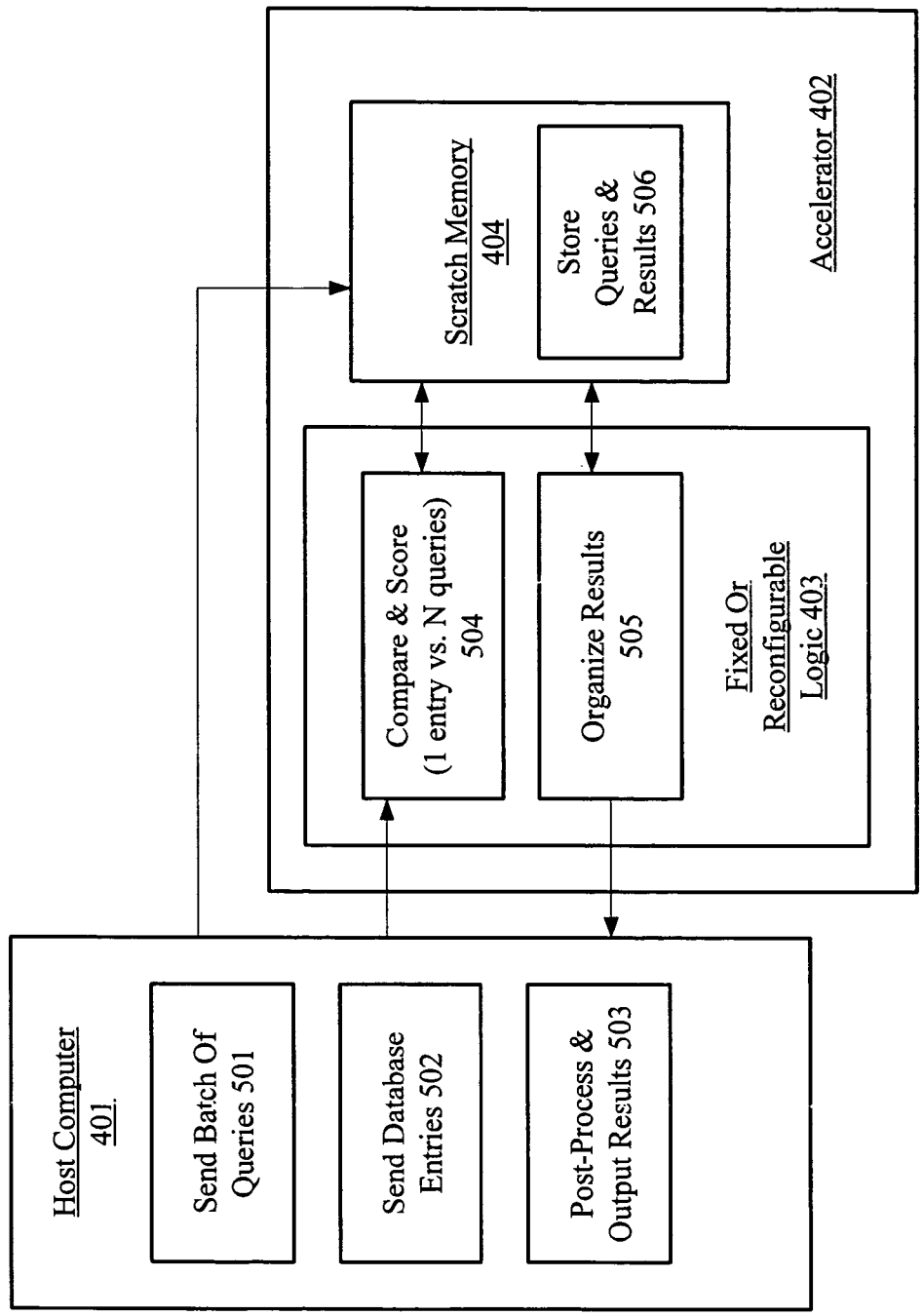
FIG. 5 illustrates the basic functions performed by the host computer and the accelerator in the bioinformatics accelerator.
Figure 6:
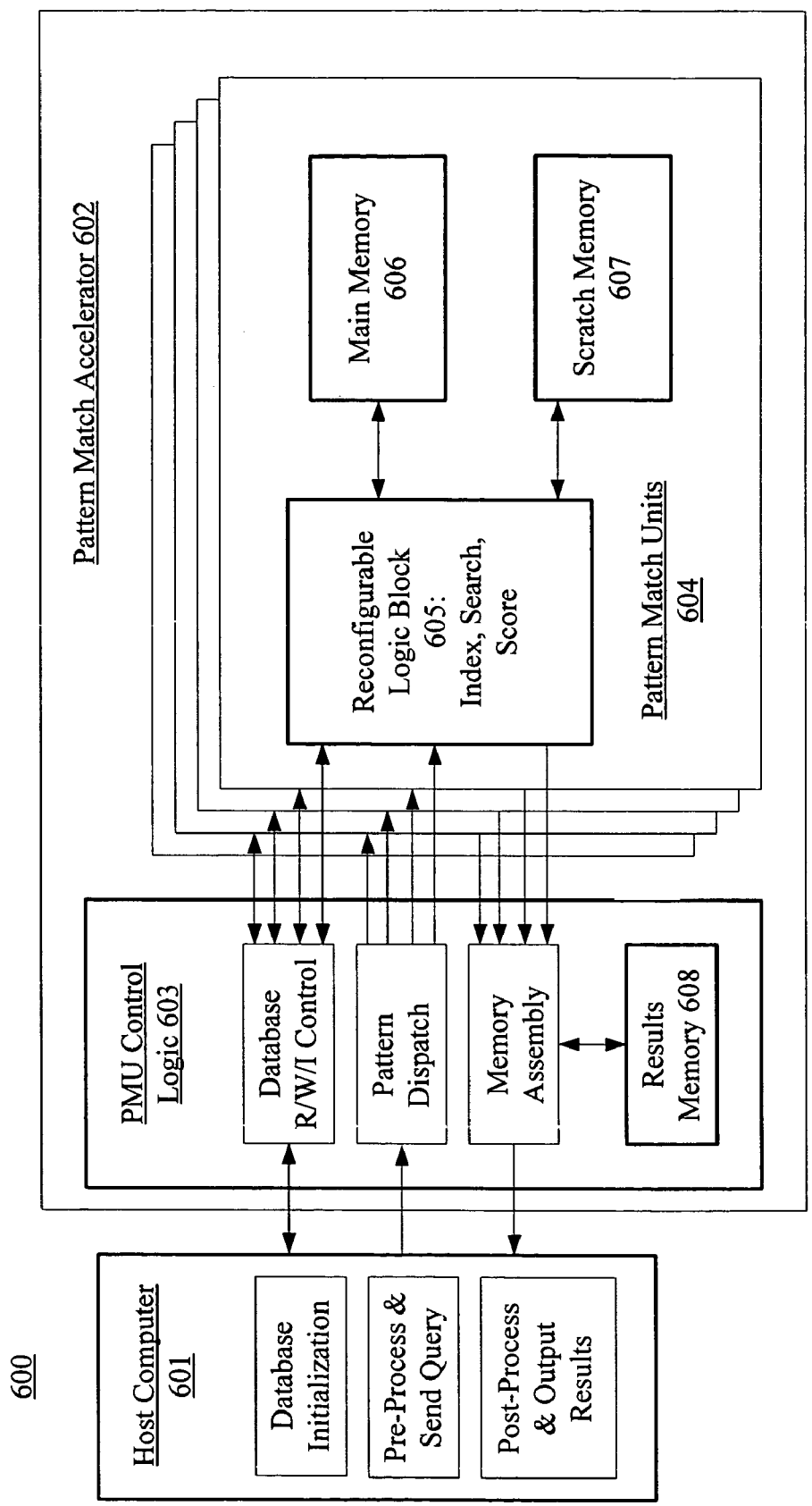
FIG. 6 illustrates a system-level architecture that can provide high-throughput, silicon efficiency, optimized memory bandwidth, and a scalable architecture. The architecture can include a pattern match accelerator, which serves as a peripheral to a host computer.

FIG. 6 illustrates a system architecture 600 that can provide high-throughput, silicon efficiency, optimized memory bandwidth, and a scalable architecture. In this embodiment, architecture 600 can include a pattern match accelerator (PMA) 602, which serves as a peripheral to a host computer 601. Advantageously, pattern match accelerator 602 can efficiently perform the "search and score" operation in a pattern match application, using either a sequential search or indexed search, whereas host computer 601 can perform the other operations in the pattern match application.

Pattern match accelerator 602 can include pattern match unit (PMU) control logic 603, which communicates with one or more pattern match units 604. Each pattern match unit 604 can include reconfigurable logic 605 for performing index, search, and score functionalities. Each pattern match unit 604 can further include a main memory 606 and a scratch memory 607 for supporting those functionalities.

In one embodiment, main memory 606 can provide a large capacity memory space (e.g. 512 megabytes or more), scratch memory 607 can provide a relatively small memory space (e.g. XXXX), and reconfigurable logic 605 can be implemented by a reprogrammable FPGA (e.g. the XC2V3000 FPGA, which can provide 3-million system gates, from the Virtex-II family of devices sold by Xilinx, Inc.). Advantageously, because each pattern match unit 604 includes its own main memory 606, pattern match accelerator 602 does not rely on host computer 601 to supply database entries during analysis, thereby eliminating memory bandwidth issues currently found in bioinformatics accelerators.

Specifically, in accordance with one aspect of the invention, each pattern match unit 604 can act as a mini-pattern match accelerator using its own database. For example, a large database such as the NCBI 'NR' protein database (e.g. 623 megabytes in file size) for mass spec protein identification could be partitioned relatively evenly into, for example, 8 mini-databases. In this case, main memory 606 of each pattern match unit 604 could include approximately a non-overlapping, one-eighth section of the 'NR' database. Any query for matching can be sent to all 8 pattern match units 604, each of which can match the query against its own main memory 606 independently.

This configuration of pattern match accelerator 602 is particularly effective because pattern match applications within large databases can be easily divided into identical applications running independently in partitions of the database. This aspect of the invention provides a clean paradigm for scaling pattern match applications to extremely large database sizes without the need for costly high-speed interconnection networks between sub-systems. In contrast, to provide this same parallel processing, extensive interconnection networks are needed in reconfigurable computers (especially those built for signal processing) and standard multi-processor computer systems. These extensive interconnection networks represent a significant component to the overall system cost.

In a pattern match accelerator 602 with more than one pattern match unit 604, pattern match unit (PMU) control logic 603 can be used to control the database (including Read, Write, and Index operations), to dispatch patterns to individual or all pattern match units 604, and to assemble the collective results (e.g. in a results memory 608) for reporting to the host computer. Note that in one embodiment, depending on the number of pattern match units 604 and the system throughput requirement, one or more of the functions performed by PMU control logic 603 could be performed by host computer 601.

To begin a pattern match application in pattern match accelerator 602, host computer 601 can initialize the database and download, via PMU control logic 603, appropriate portions of the database into main memories 606. Specifically, this downloading ensures that each database entry resides in one and only one pattern match unit 604. For example, a database containing 800,000 entries can be loaded into an 8-unit pattern match accelerator 602 with an average of 100,000 entries per pattern match unit 604 residing in each main memory 606.

In some embodiments, depending on the nature of the pattern match function, it may be advantageous to partition the database pseudo-randomly, into species-specific, or using other partitioning criteria.

Host computer 601 can also perform any pre-processing, if desired, and send queries to pattern match accelerator 602. PMU control logic 603 can receive these queries and can multiply each query for each pattern match unit 604 (called pattern dispatch). Reconfigurable logic block 605 can interface with main memory 606 and scratch memory 607 to perform the "search and score" operation for the query. PMU control logic 603 can receive and assemble the results of the scoring provided by each reconfigurable logic block 605 (called memory assembly) and forward those results to host computer 601 for any post-process operation and output to a user.

Figure 7:
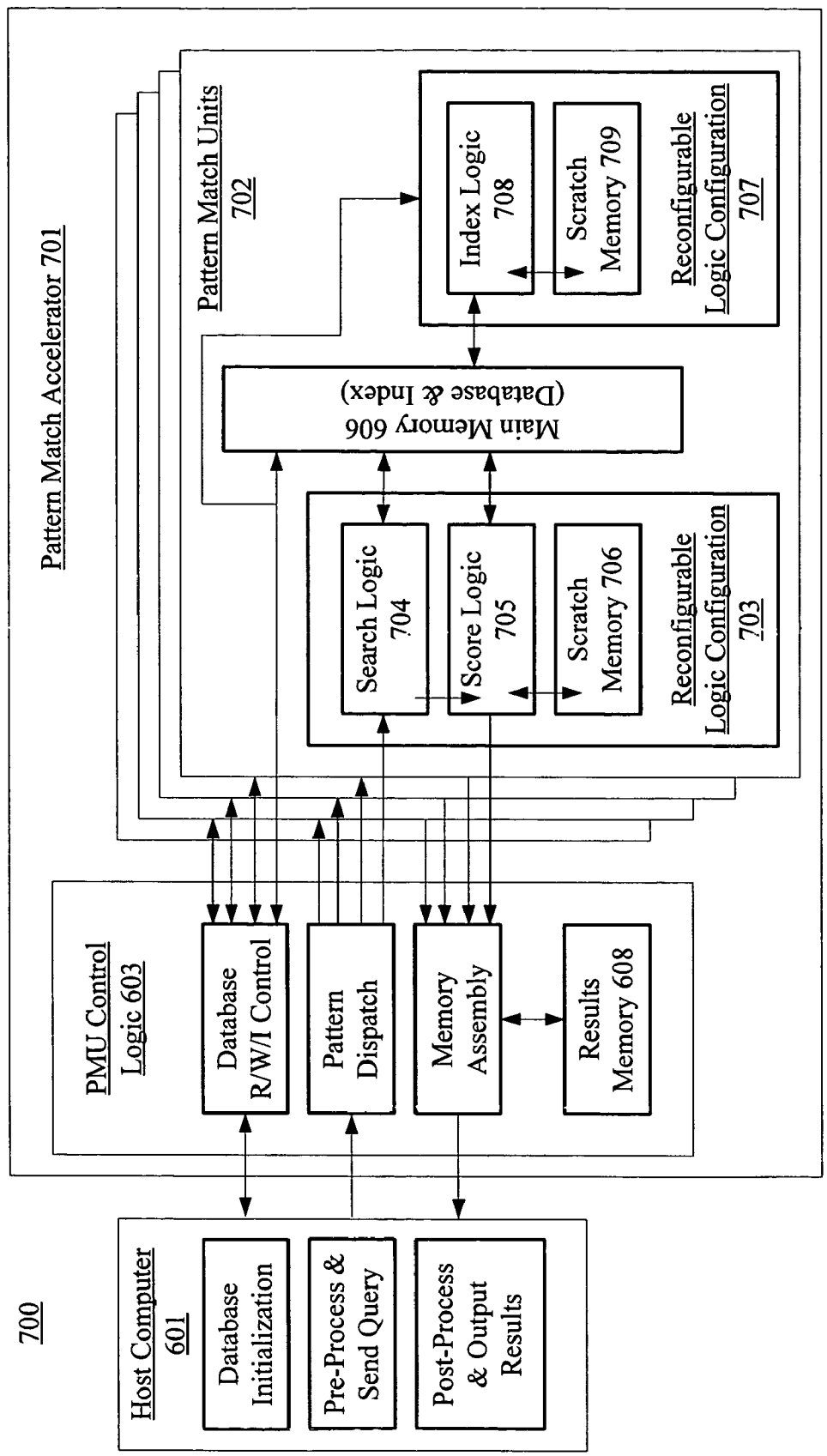
FIG. 7 illustrates a system-level architecture that can include a pattern match accelerator having a reconfigurable logic block that implement distinct configurations, each reconfigurable logic configuration providing a unique function.

In one embodiment shown in FIG. 7, a system architecture 700 can include a pattern match accelerator 701 having a reconfigurable logic block that implement distinct configurations, each reconfigurable logic configuration providing a unique function. For example, a reconfigurable logic configuration 703 can provide search logic 704, score logic 705, a scratch memory 706 for performing "search and score" functionality, whereas a reconfigurable logic configuration 707 can provide index logic 708 and scratch memory 709 for performing indexing functionality. In this embodiment, PMU control logic 603 can select the appropriate reconfigurable logic configuration for pattern match units 702. In one embodiment, this means selecting one of reconfigurable logic configuration 703 and reconfigurable logic configuration 707 for all pattern match units 702.

Figures 8A, 8B:
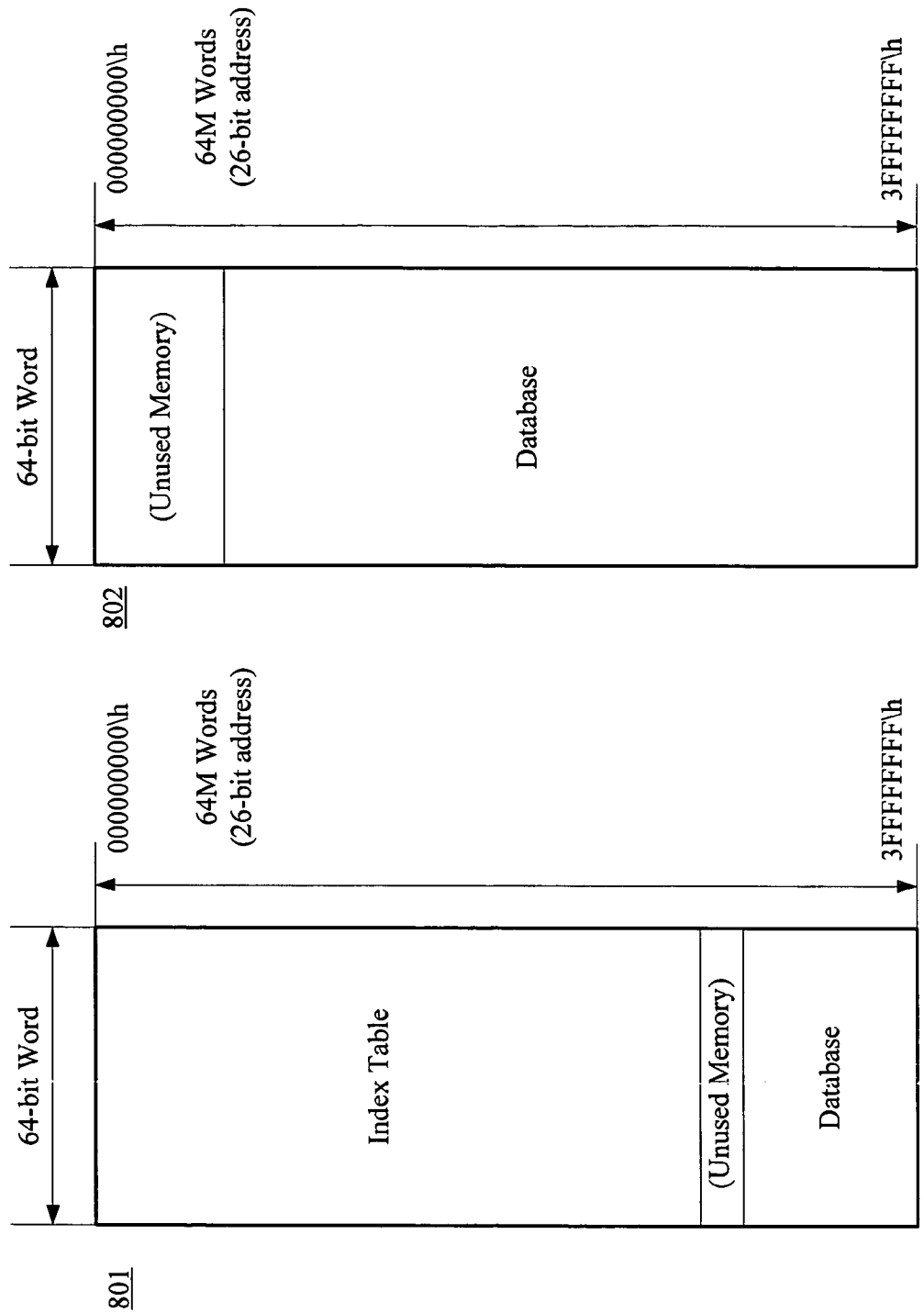
FIGS. 8A and 8B illustrate exemplary data organizations within a main memory of a pattern match unit.

FIGS. 8A and 8B illustrate exemplary data organizations within a main memory of a pattern match unit. For a small database relative to its associated index table, the data organization 801 of FIG. 8A can be used. In contrast, for a large database, data organization 802 of FIG. 8B can be used. In one embodiment, the main memory can be organized by 64-bit words and can accommodate 64M words accessible using a 26-bit address.

Note that for database sizes that exceed all the available memory, the host computer can emulate an arbitrary-size pattern match unit that accommodates all overflow database entries. For example, in a pattern match accelerator system with 8 physical pattern match units, the host computer can emulate a $9^{th}$ pattern match unit for overflows. In this emulated pattern match unit, "search and score" operations can be done in software. This emulation capability allows the pattern match accelerator system to accept any size databases, although performance is logically enhanced where the main memory is large enough to accommodate the entire database, and even faster still if the main memory can accommodate the database and index tables.

In the database organizations shown in FIGS. 8A and 8B, the main memory can be filled with database entries starting from the highest address location (e.g. 3FFFFFFF\h) and filling in a decreasing address order (e.g. approaching 00000000\h). In contrast, an index table, if present (see FIG. 8A), can start from the lowest address location and fill in increasing address order. This organization can optimally use the memory because the ratio of index table to the database varies depending on the index operation. Additionally, this organization allows new database entries and new index entries derived from those new database entries to be added incrementally (i.e. with a re-sorting of the index table).

Referring to FIGS. 7, 8A, and 8B, after the database is loaded into pattern match accelerator 701, PMU control logic 603 can instruct each pattern match unit 702 to prepare its own database for optimal searching (where memory permits). This preparation may include indexing the entries using index logic 708 and scratch memory 709, and storing the original database entries as well as the resulting index table (using organization 801) in main memory 606.

For example, in mass spec protein identification, the database consists of sequences of amino acids that make up each protein in the database. The indexing operation of this database can generate a table indexed by the molecular mass of a peptide (sub-sequence of a protein). Thus, a program searching for all peptides with molecular weight of 3618.3 Daltons could look in the index table under "3618" to find all instances (i.e. database entry number, the beginning amino acid position, and length) within the database with a mass greater than or equal to 3618.0 and less than 3619.0.

In one embodiment, the index table can also store information that facilitates advanced searching. For example, researchers doing protein identification may look for one or multiple phosphorylation sites on amino acids serine and tyrosine. In this case, it would be useful to store the total number of these particular amino acids along with the instance information within the index table. Note that the indexing operation can be initiated during the first loading of the database, if the search criterion is known at that time. The indexing operation can also be run "on-the-fly" during runtime, if the search criterion changes.

Compared to indexing done by a standard computer, the indexing operation can be performed very rapidly by index logic 708, because (1) the database is indexed in parallel and independently within each pattern match unit 702, (2) the indexing function can be performed primarily with hardware, and (3) the data bandwidth is not limited by any factors other than the memory itself. Most indexing operations require the initial computation of indices, which are then sorted by the index. The sorting of large databases is a well-known, time-consuming problem in computer science. For example, for standard single-processor computers, the well-known "Quick-Sort" algorithm performs well on the average, but it cannot be parallelized.

In contrast to a standard computer, all the available FPGA logic resources in pattern match units 702 can be configured as a parallelized, sorting engine during the index operation (i.e. using reconfigurable logic configuration 707). Note that reconfigurable logic can use both parallelized hardware-based approaches (e.g. Batcher's method) and software-based methods (e.g. Quick-Sort and Radix-Sorts). Software methods can be easily accommodated within an FPGA by using a "soft" processor approach (e.g. the Altera NIOS or a commercially available FPGA with built-in "hard" processor, such as the PowerPC processor within a Xilinx XC2VP20 Virtex-II Pro device). In one embodiment, scratch memory 709 can store the indexing program and provide additional memory resources.

When the indexing operation is done, pattern match accelerator 701 can run the pattern match application. Specifically, after receiving acknowledgement from all pattern match units 702 that indexing is complete, PMU control logic 603 can reconfigure the FPGA to provide "search and score" functions, i.e. using reconfigurable logic configuration 703. Advantageously, search logic 704 and score logic 705 can be highly parallelized, i.e. with multiple logic units working independently on main memory 606. In practice, the reconfigurable logic block, e.g. an FPGA, can be configured with as many independent search logic units 704 and score logic units 705 as can be provided on the FPGA. Overall performance can be scaled by having a larger FPGA, thereby increasing the number of independent search logic units and score logic units, and by having a faster FPGA, thereby increasing how quickly each search logic unit and score logic unit can process the matches.

Search logic 704 uses the query provided by PMU control logic 603 (using pattern dispatch) to search the database stored in main memory 606. For an indexed search, search logic 704 can read the index table in main memory 606 to retrieve all database instances within the mass range (a input mass of 3618.3 may generate a search for all masses from 3616 to 3620, for example). Score logic 705 takes each of these instances and scores them.

This scored information can then be passed to PMU control logic 603. In one embodiment, PMU control 603 can determine whether the instance is scored high enough to be stored in results memory 608 and/or reported to host computer 601. In one embodiment, multiple pairs of search logic 704 and score logic 705 can be provided (determined by the available resources within the reconfigurable logic block), thereby resulting in simultaneous searching and scoring of multiple database instances for high throughput. After all the instances within an index search are scored, the pattern match analysis for that query is concluded. At this point, pattern match accelerator 702 is ready for the next query.

In the case of a sequential search, search logic 704 can retrieve each database entry from the beginning of the database table (e.g. starting at the highest address location and proceeding in a decreasing manner). For example, search logic 704 can systematically search for all sub-sequences of amino acids with a total mass within the needed range (e.g. 3616 to 3620 as used in the above example), by starting with the $1^{st}$ amino acid and adding all the masses until the calculated mass exceeds the range. Search logic 704 can then subtract the $1^{st}$ amino acid, and then proceed to extend the sub-sequence until the calculated mass is within range (in which case this sub-sequence instance is sent to score logic 705) or exceeded (in which case the beginning amino acid is removed and the sub-sequence is extended), and so on.

After the first database entry is searched, the second database entry is searched in the same way, until all the database entries are searched. Along the way, those sub-sequences determined to be a candidate (by having a calculated mass within range) are scored by score logic 705. After the database is fully searched, score logic 705 may trim the results by eliminating grossly undervalued scores and then pass the remaining results to host computer 601 for full post-processing and reformatting, from which an output report is generated. The results can include a list, sorted in decreasing order of relevance, of database entries that best match the query.

Mass Spectrometry Protein Identification Example

This section briefly describes one embodiment of a pattern match accelerator and how it can be used to accelerate protein identification software (such as X! Tandem as licensed by Manitoba Proteomics Centre). In this example, assume an indexed search is to be performed on the popular "Swiss-Prot" protein database (currently consisting of approximately 140,000 protein sequences with an approximate database size of 57 megabytes) using a common set of search conditions.

Figure 9:
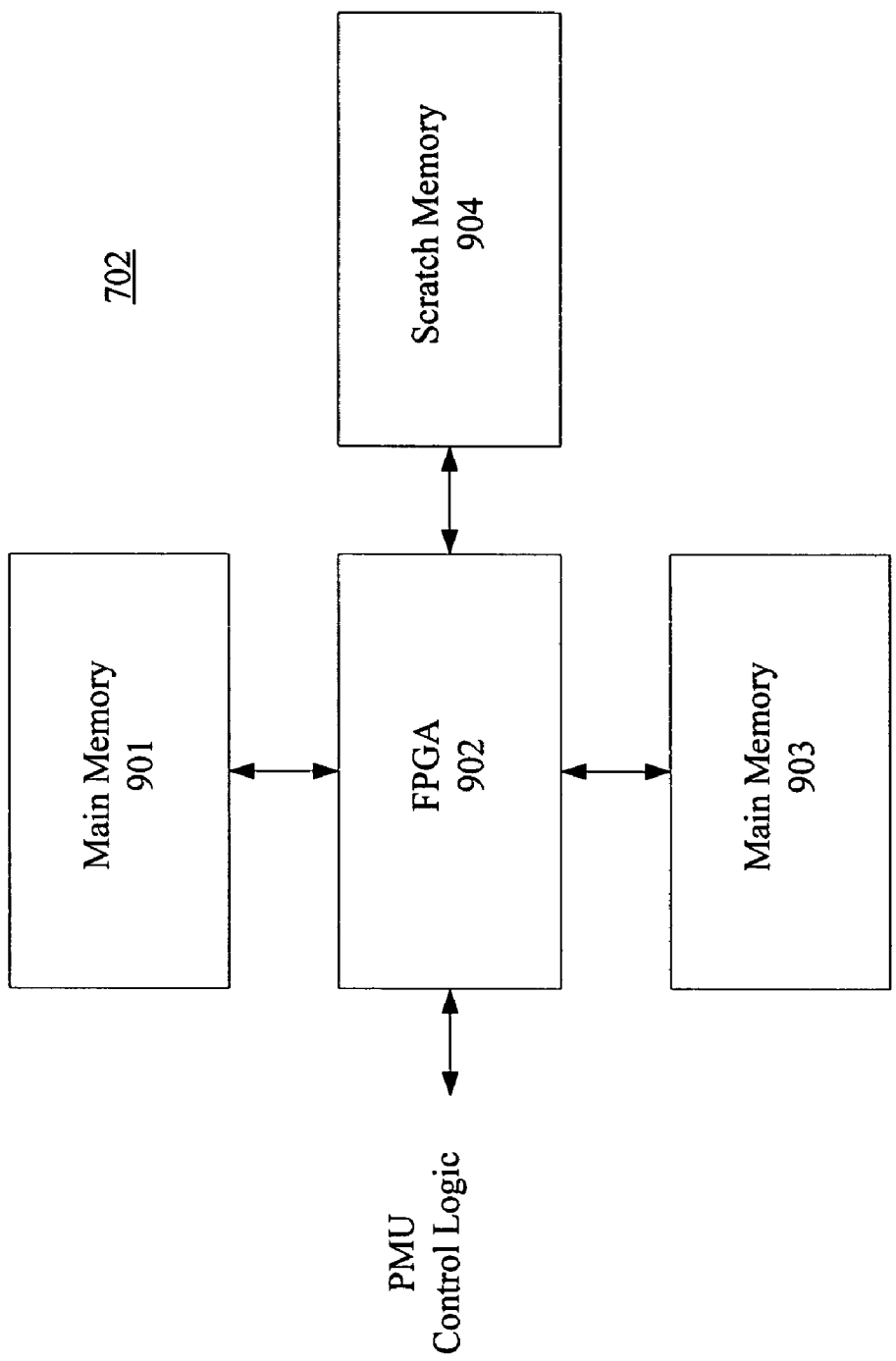
FIG. 9 shows one embodiment for a pattern match unit, which has a split-memory architecture including two main memory blocks.

FIG. 9 shows one embodiment for a pattern match unit 702, which has a split-memory architecture including two main memory blocks 901 and 903. In one embodiment, each of main memory blocks 901 and 903 can include 512 megabytes of dynamic random access memory (DRAM). An FPGA 902 (i.e. the reconfigurable logic block) feeds and controls each of main memory blocks 901 and 903, as well as a scratch memory 904. In one embodiment, scratch memory 904 can include 16 megabytes of static random access memory (SRAM).

Advantageously, this split-memory configuration can be used to facilitate sorting large index tables, i.e. it is useful for some algorithms to have one memory as the unsorted input table and another memory for the sorted table. Therefore, compared to two independent pattern match units each with 512 megabytes and an FPGA of half-density, the split-memory architecture of FIG. 9 allows double the FPGA resources to be used for sorting the index tables.

Figure 10:
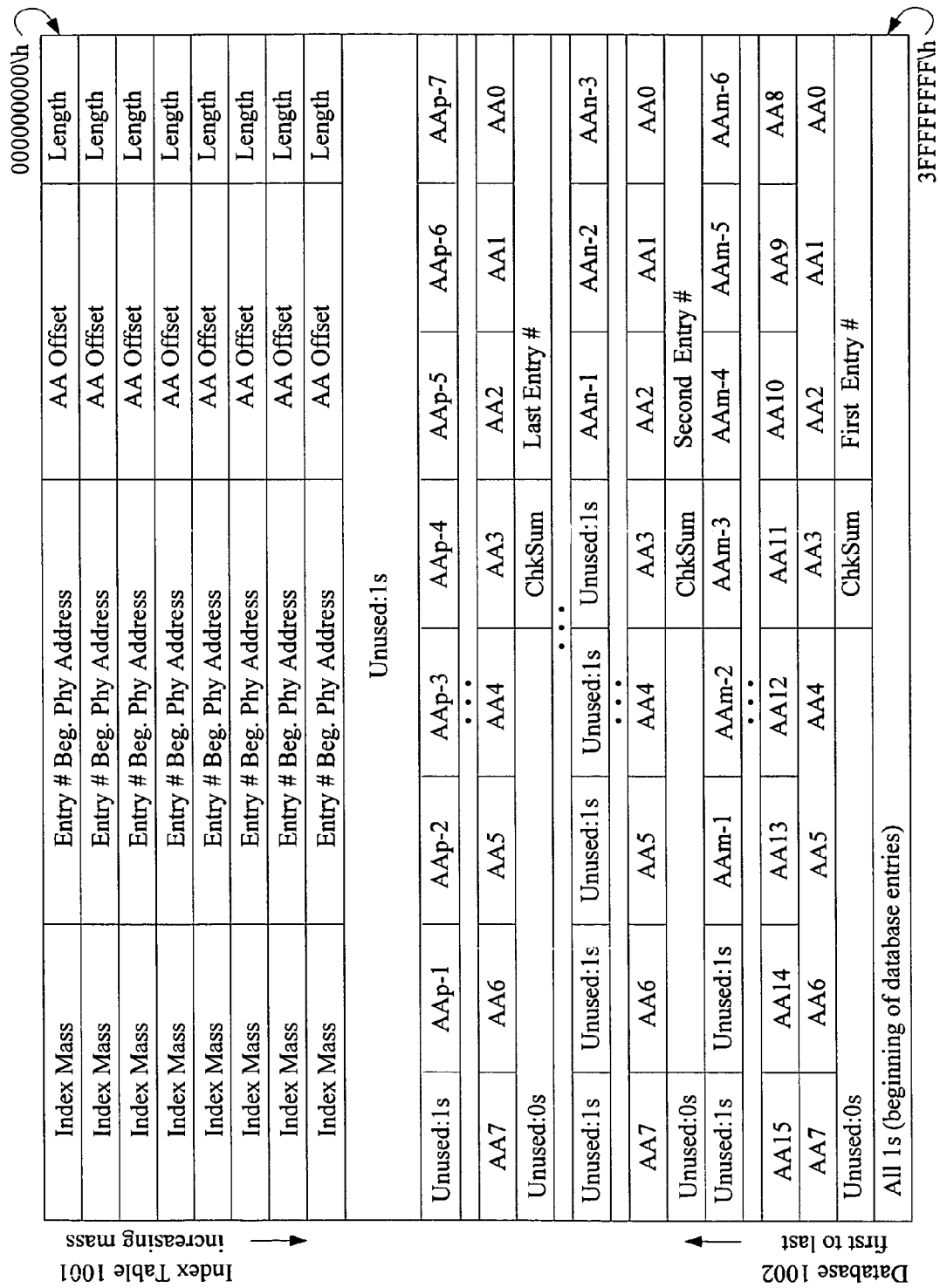
FIG. 10 shows the memory map for each main memory, which includes an index table in the lowest address space and a database in the highest address space.

FIG. 10 shows the memory map 1000 for each main memory, which includes an index table 1001 in the lowest address space (ending at 000000000\h) and a database 1002 in the highest address space (starting in 3FFFFFFFF\h). As noted previously, the host computer can supply database 1002 during the database preparation stage. As each database entry is sent to the pattern match accelerator, the human-readable text header can be replaced by a numerical entry number (1, 2, 3, and so on) together with an 8-bit checksum (ChkSum) of the replaced text header. The checksum allows cross-checking of the header to eliminate any errors when correlating PMA-generated results with the host computer database.

In this example, the memory can be loaded with database entries starting at the next-to-last highest address (the first address is all 1's to indicate the beginning of database entries) and working with decreasing addresses. The first 64-bit word contains the database entry head, which includes the entry number (#) (e.g. 24-bit) and checksum (e.g. 8-bit). Subsequent words are stored as 1 to 8 ASCII characters, each word denoting one of 24 amino acid identifiers. The end of the sequence can be padded with 1 to 8 unused 8-bit codes ("FF" in hexadecimal). The second entry has the identical format of one 64-bit header plus as many words as is necessary to represent the sequence of amino acids. This continues until the entire database is loaded into the main memory.

FIG. 11 shows the definition of the parameters used in the memory map, including the maximum and minimum values allowed, the number of bits assigned, and a comparison to the maximum value in the popular protein database Swiss-Prot. The database entry number is assigned an abundant 24-bit value to represent any integer from 0 to $2^{26}-1$. It is used to uniquely identify a database entry and is assigned in the order: 1, 2, 3, and so on. Clearly, the allowed values are much larger than is needed by Swiss-Prot (which can fit into a 17-bit address space with less than $2^{17}$ entries), but they will be useful for much larger databases. The entry annotation checksum is an 8-bit checksum of the ASCII text header description, which is calculated when the original annotated database is pre-processed to replace long text identifiers with the database entry number. This same 8-bit value is stored within the host computer and also in the PMA main memory, and it is used as a check for mismatch errors (such as a database corruption, for example). The length of the database entry represents how many amino acids are in a given database entry.

Entries, i.e. known proteins in current databases, can be comfortably fit into a 14-bit space. To point to a unique instance of a subsequence within the database, the database entry (specified by the database entry# plus the checksum tag for error checking), the beginning point within the entry (specified by the amino acid offset, starting with '0' as the first amino acid, '1' as the $2^{nd}$, and so on), and the length of the sub-sequence (specified by the length parameter, e.g. 8-bits based on common subsequence definitions) can be indicated. The index for the index table can be defined to be a 16-bit integer corresponding to the subsequence mass, expressed in Daltons and rounded down to the nearest Dalton. This definition allows a mass of $2^{32}-1$ Daltons, which is adequate for common subsequence definitions.

For fast hardware calculations, the index table can use an absolute (physical) address of 26-bits (for the 64M words× 64-bit memory) that points to the header word of the entry. For example, to point at the $10^{th}$ amino acid ('AA9') of the first entry (starting at physical address '3 FFFF FFFE\h'), the physical address and offset are '3 FFFF FFFE' and '9', respectively. In particular, it is not '3 FFFF FFFD' and '1'. Finally, the amino acid identifier is currently the ASCII representation of the upper case alphabetic character assigned to the amino acid. There are currently 24 such letters assigned (all letters are used except for 'J' and 'U') to denote any of the 20 naturally occurring amino acids, the amino acid Ornithine, or one of 3 amino acid pairs that are difficult to distinguish experimentally.

After the database is loaded, the reconfigurable logic can be configured for index table creation. In this example, each database can be broken into subsequences according to the search criterion. Each database entry may generate 50 or more subsequences, each of which has its own index table instance indexed by its mass, rounded down to the nearest Dalton. These instances will initially be stored sequentially as they are calculated, and are not yet sorted by their masses. The instance can be stored in the form of the database entry physical address (that is, the 24-bit physical address of the header of the entry), the amino acid offset (that is, the beginning amino acid location of the subsequence), and the length of the subsequence.

After all the subsequences are indexed, the reconfigurable logic can be configured for a fast sorting operation, whereby the entire index table is sorted according to increasing index (=mass) value. Note that there can be over 60 million entries, which would take a traditional computer a long time to sort. However, because reconfigurable logic is used, all available reconfigurable logic resources can be used to sort this list. In one exemplary configuration, 32 "soft processors" (i.e. programmable logic devices configured to perform processor functions) can be created, each soft processor for sorting $\frac{1}{32}$ of the memory and running a Quick-sort program. The resulting 32 sections may be merged using hardware, which sequentially reads and increments the address counter of the memory with the smallest value, until all the 32 memories are fully read.

After the sorting is complete, the reconfigurable logic can be configured for running the pattern match application. For each query, the host computer may simply send the query along with the beginning and end of the index table address space. (For example, the host computer can send a mass spectrum for matching, along with addresses corresponding to a mass of 3616 to 3620 Daltons.) The pattern match accelerator hardware, i.e. the PMU control logic, can dispatch this information to all the pattern match units. All database entry instances (i.e. protein subsequences) within the mass range of interest that score adequately high will be assembled and reported back to the host computer for post-processing and output.

Exemplary Application for Pattern Match Accelerator

Mass spectrometry protein identification, which highlights one real-world need for pattern match accelerators, is now briefly described. Note that this exemplary application for a pattern match accelerator is illustrative only and not limiting. The pattern match accelerator has many applications in life science, Internet commerce, and other fields.

The Swiss-Prot database today contains approximately 140,000 entries of protein sequences. These entries are stored in the "FASTA" format, which is a text format in which each entry consists of a single header line followed by one or more lines with the amino acid sequences. The header line starts with the '>' character followed by human-readable annotation unique to the protein sequence. The amino acid sequences are denoted by a continuous string of the 24 characters from "A" to "Z" (characters "J" and "U" which are not used). Each character represents either one of 20 naturally occurring amino acids, the amino acid Ornithine, or one of 3 amino acid pairs that are difficult to distinguish experimentally. In the FASTA format, the amino acid sequences can occupy as many text lines as needed, with no spaces in between amino acid letters. Even though the protein itself is a long unbroken sequence of amino acids, it is convenient to break the representation into multiple text lines for readability. In summary, each FASTA database entry consists of a single protein sequence, starting with a descriptive header line followed by one or more amino acid sequence lines.

Drug discovery researchers may use the tandem mass spectrometer to identify unknown proteins in a complex mixture, such as to compare the protein profile between a normal and a diseased state. First, the biological sample (e.g. blood) is chemically purified to remove non-protein elements such as lipids and salts, as well as high abundance proteins such as albumin to improve the measurement quality. The mixture may undergo further separation using 2-dimensional gels or other techniques to reduce the number of different proteins per sample to 1000 or less. Natural proteins consist of polymer chains of hundreds to thousands of amino acids, many of which are too large for mass spectrometry analysis. At this point, a digestive enzyme with amino acid-specific cleavage sites (typically the enzyme trypsin is used, which cleaves at the Carbon side of either of the amino acids Lysine "K" or Arginine "R"), which "digests" the long amino acid polymers into shorter peptides with lengths typically between several up to 60 amino acids long. For example, a 1000-protein mixture may become a 50,000 peptide mixture after the digest step.

The mixture may be put into a liquid chromatography (LC) column that feeds a tandem mass spectrometer. The LC column serves to separate the 50,000 peptide mixture by various chemical attributes, so that only one or a small number of peptides enter the tandem mass spectrometer.

The tandem mass spectrometer consists of two mass spectrometer (MS) vacuum chambers, each of which can detect precise masses (down to 0.01 atomic mass unit resolution in advanced models). In the first chamber, the peptide solution (containing one or several peptides) is forced through a fine electrically charged needle, which imparts electrical charges onto the liquid sample. Under certain conditions, the individual peptides become charged and come out of solution. These charged peptides in the gas phase become accelerated by a high electrical field in the chamber and move toward a charge detector. For a given voltage applied to the acceleration plates, only charged peptides of a given mass/charge ratio will have the correct trajectory to strike the detector. Lower mass/charge peptides will strike above the detector, while higher mass/charge peptides will strike below the detector. By sweeping the accelerator plate voltage, the precise masses (actually mass/charge ratios) may be measured for all charged particles present. If a single peptide is present, and ionization control causes only a single charge to be imparted on each individual peptide, then a single mass/charge will be registered. If there are three different peptides each singly charged in the chamber, there will be exactly three "peaks" measured in the spectrum, each corresponding to one of the three peptides. Therefore, the precise mass of a peptide may be determined in the first MS chamber.

In the tandem MS system, the detection area of the $1^{st}$ chamber can also lead to a collision chamber (filled with inert gas) before entering the $2^{nd}$ MS vacuum chamber. The selected mass/charge peptides from the $1^{st}$ chamber (the only ones with the right mass/charge to enter the detector and collision chamber based on its trajectory) collide with the inert gas in the collision chamber. A well-controlled collision will tend to break the peptide apart into exactly 2 pieces, with the breakage occurring at the bond (called the peptide bond) between adjacent amino acid pairs. The $2^{nd}$ MS chamber then measures the mass of all the resulting fragments, again by accelerating the charged peptide fragments (assume mostly singly charged) to the detector. By sweeping the acceleration voltage in this $2^{nd}$ MS chamber, each mass/charge ratio of each of many fragments is precisely measured. This series of mass/charge is a unique signature that can be used to identify the peptide, and ultimately help identify the original protein.

A process of both measuring the original mass and obtaining the fragment spectrum of an unidentified peptide is now described. For simplicity, assume all peptides and fragments are singly charged, so mass/charge ratio equals the mass. Further assume that the unknown peptide has the amino acid sequence "ACGHR" (or Alanine-Cysteine-Glycine-Histidine-Arginine).

When the peptide enters the $1^{st}$ chamber, the $1^{st}$ chamber acceleration voltage is swept to determine the masses of all peptides present. In this sweep, the $1^{st}$ MS will find a detected peak at 514.2 Dalton (atomic mass units) in the x-axis, for example. (The peak, or y-value, is considered to be of less importance than the x-value, due to high sensitivity to many poorly understood factors including complex chemistry effects. In contrast, the x-values, corresponding to the masses detected, are very reproducible.) This is the sum of the individual amino acid masses (496.2 Dalton), plus 18.0 Dalton to account for the Hydrogen at the Nitrogen end and trailing Oxygen-Hydrogen at the Carbon end of the peptide chain.

The MS system then sets up this particular peptide (by adjusting the $1^{st}$ chamber acceleration voltage to only select this mass) to enter the collision chamber, while sweeping the acceleration voltage in the $2^{nd}$ MS chamber to measure the resulting fragment masses. Under this setting, only peptides of the mass 514 can reach the collision chamber.

In well-controlled collision conditions, this 5-amino acid peptide can break into two pieces at 4 places (i.e. after "A", "AC", "ACG", or "ACGH"). If the analysis is simplified by ignoring the extra H and OH calculations, as well as assume a completely clean fragmentation into exactly two pieces, then 8 different masses will be detected corresponding to the fragments {A, AC, ACG, ACGH, CGHK, GHK, HK, and K}, with corresponding theoretical masses of {137.1, 174.0, 231.1, 368.1, 453.2, 350.2, 293.2, and 156.1}. This mass spectrum is unique to the peptide sequence "ACGHR" and may be used to identify the unknown peptide. In practice, many of the predicted masses may be absent from measurement due to complex chemistry effects, so the identification is obtained by pattern match. That is, an unknown peptide (as part of its original protein) may be identified as having the sequence "ACGHR" despite having missing mass values, on the basis of the best pattern match among all the proteins in the database.

The X! Tandem application takes as the input query a file that contains the parent mass and the fragment mass spectrum. The query is pre-processed to normalize all the detected peaks, with the highest peak defined as 1.00, and small (<0.02) normalized peaks are omitted. Assuming a complete digest using the enzyme trypsin is assumed in the user settings (so only theoretical peptides ending in 'R' or 'K' are considered within each database protein sequence, along with the very last peptide), the application loads in a set of 500 database proteins from the hard-disk.

For each database protein, the theoretical peptide sequences are extracted (again, the breaks occur right after 'R' or 'K' and no where else, under the current assumption of complete digestion using trypsin). The program computes the peptide mass (from the sum of constitute amino acid masses plus 18 Dalton for H+OH) of each peptide of each database protein. Each peptide whose mass is similar to the query parent mass within a tolerance of 1 Dalton constitutes a hit. For each peptide hit, the theoretical spectrum is computed and scored against the pre-processed query spectrum. In the theoretical spectrum, the masses are calculated from the masses of each possible fragment (assuming a clean break into 2 pieces as before), while the peak is assumed to be 1.0. The score is defined as the sum of all query peaks whose mass is found in the theoretical mass spectrum. The proteins whose peptides score the highest are post-processed to derive statistics and output formatting. At this point, the high scoring proteins that pass the statistical post-processing can be printed to an output file.

OTHER EMBODIMENTS

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

Accordingly, it is intended that the scope of the invention be defined by the following Claims and their equivalents.

The invention claimed is:

1. A system architecture for pattern match applications, the system including:
a host computer that transmits a database and a query associated with the database; and
a pattern match accelerator that receives the database and the query, performs search and score operations for a pattern match application on the database using the query, and provides results of the pattern match application to the host computer, the pattern match accelerator serving as a peripheral to the host computer, the pattern match accelerator including:
a plurality of pattern match units, each pattern match unit receiving the query, and each pattern match unit including:
a main memory that stores a portion of the database; and
a programmable logic device that performs the search and score operations on the portion of the database; and
pattern match unit (PMU) control logic that interfaces between the host computer and each pattern match unit, wherein the programmable logic device is configured at a first point in time to generate an index of the database, which is stored in the main memory, and is configured at a second point in time to perform the search and score operation using the index,
wherein the main memory is mapped to provide that a database portion starts from one end of the main memory whereas the index starts from another end of the main memory.

2. A system architecture for pattern match applications, the system including:
a host computer that transmits a database and a query associated with the database; and
a pattern match accelerator that receives the database and the query, performs search and score operations for a pattern match application on the database using the query, and provides results of the pattern match application to the host computer, the pattern match accelerator serving as a peripheral to the host computer, the pattern match accelerator including:
a plurality of pattern match units, each pattern match unit receiving the query, and each pattern match unit including:
a main memory that stores a portion of the database; and
a programmable logic device that performs the search and score operations on the portion of the database; and
pattern match unit (PMU) control logic that interfaces between the host computer and each pattern match unit, wherein the programmable logic device is configured at a first point in time to generate an index of the database, which is stored in the main memory, and is configured at a second point in time to perform the search and score operation using the index,
wherein the main memory includes a first memory that stores an unsorted index table and a second memory that stores a sorted index table.

3. The system architecture of claim 1 or 2, wherein each database entry in the main memory includes an entry number and a checksum to cross-correlate the results in the host computer.

4. The system architecture of claim 1 or 2, wherein the PMU control logic assembles results of the pattern match application from each pattern match unit.

5. The system architecture of claim 1 or 2, wherein the host computer outputs the results.

6. The system architecture of claim 1 or 2, wherein the host computer provides post-processing of the results before outputting the results.

7. The system architecture of claim 1 or 2, wherein the host computer functions as a virtual pattern match unit when the database exceeds a predetermined size.

8. A method of performing a search and score operation for a pattern match application, the method comprising:

dividing a database to provide that each of a plurality of pattern match units receives a database portion;

storing each database portion in a main memory of the pattern match unit; receiving a query for the database at each pattern match unit;

performing the search and score operation on each database portion with the query using a reconfigurable logic device provided in the pattern match unit;

configuring the reconfigurable logic device at a first point in time to generate an index of the database portion, the index being stored in the main memory, and configuring the reconfigurable logic device at a second point in time to perform the search and score operation using the index; and assembling and outputting results from the plurality of pattern match units; and mapping the main memory to provide that the database portion starts from one end of the main memory and the index starts from another end of the main memory.

9. A method of performing a search and score operation for a pattern match application, the method comprising:

dividing a database to provide that each of a plurality of pattern match units receives a database portion;

storing each database portion in a main memory of the pattern match unit; receiving a query for the database at each pattern match unit;

performing the search and score operation on each database portion with the query using a reconfigurable logic device provided in the pattern match unit;

configuring the reconfigurable logic device at a first point in time to generate an index of the database portion, the index being stored in the main memory, and configuring the reconfigurable logic device at a second point in time to perform the search and score operation using the index; and assembling and outputting results from the plurality of pattern match units; and using a first memory of the main memory that stores an unsorted index table and using a second memory of the main memory that stores a sorted index table.

10. The method of claim 8 or 9, further including providing an entry number and a checksum for each database entry.

11. The method of claim 8 or 9, wherein assembling the results includes at least one of filtering the results and ranking the results.

12. The method of claim 8 or 9, further including post-processing of the results before outputting the results.

13. The method of claim 8 or 9, further including creating a virtual pattern match unit when the database exceeds a predetermined size.

* * * * *